United States Patent
Staiger et al.

(10) Patent No.: US 8,074,524 B2
(45) Date of Patent: Dec. 13, 2011

(54) PIEZOELECTRIC MEASURING ELEMENT WITH TRANSVERSE EFFECT AND SENSOR COMPRISING SUCH A MEASURING ELEMENT

(75) Inventors: Ulrich Staiger, Stein am Rhein (CH); Paul Engeler, Frauenfeld (CH); Claudio Cavalloni, Regensdorf (CH)

(73) Assignee: Kistler Holding, AG, Winterthur (CH)

( * ) Notice: Subject to any disclaimer, the term of this patent is extended or adjusted under 35 U.S.C. 154(b) by 495 days.

(21) Appl. No.: 12/299,196

(22) PCT Filed: May 2, 2007

(86) PCT No.: PCT/CH2007/000212
§ 371 (c)(1),
(2), (4) Date: May 4, 2009

(87) PCT Pub. No.: WO2007/128149
PCT Pub. Date: Nov. 15, 2007

(65) Prior Publication Data
US 2009/0217768 A1     Sep. 3, 2009

(30) Foreign Application Priority Data

May 4, 2006  (CH) ........................... 0729/06
Jun. 7, 2006  (CH) ........................... 0924/06

(51) Int. Cl.
*H01L 41/00*  (2006.01)
*H02N 2/00*  (2006.01)
*G01L 1/00*  (2006.01)

(52) U.S. Cl. ............ 73/780; 73/777; 310/328; 310/329; 310/338

(58) Field of Classification Search ................ 73/780, 73/862.68, 763, 774, 777, 818; 310/338, 310/328–329
See application file for complete search history.

(56) References Cited

U.S. PATENT DOCUMENTS

| | | | |
|---|---|---|---|
| 3,495,102 A | | 2/1970 | List et al. |
| 3,566,163 A | * | 2/1971 | Fischer et al. ............... 310/338 |
| 3,568,124 A | * | 3/1971 | Sonderegger .................. 73/754 |
| 3,569,747 A | * | 3/1971 | Siegel ........................... 310/329 |
| 3,582,691 A | * | 6/1971 | Sonderegger et al. ........ 310/328 |
| 3,614,678 A | * | 10/1971 | Engeler et al. ................ 333/187 |
| 3,743,869 A | * | 7/1973 | Hugli ............................ 310/338 |
| 4,009,447 A | * | 2/1977 | Wolf et al. .................... 310/314 |
| 4,016,437 A | * | 4/1977 | Calderara et al. ............. 310/338 |
| 4,314,481 A | * | 2/1982 | Wolfer et al. ................... 73/774 |
| 4,326,143 A | * | 4/1982 | Guth et al. ..................... 310/329 |
| 4,341,974 A | * | 7/1982 | Calderara ..................... 310/329 |

(Continued)

FOREIGN PATENT DOCUMENTS

DE    3727221    8/1987

(Continued)

*Primary Examiner* — Lisa Caputo
*Assistant Examiner* — Jonathan Dunlap
(74) *Attorney, Agent, or Firm* — Dority & Manning, P.A.

(57) ABSTRACT

A piezoelectric measuring element comprises at least one bar with transverse effect which can be used with two conductor technology. Poles comprising the metallizations, electrodes and lines in the measuring element are embodied with one or more piezoelectric bars with transverse effect such that the electric capacitances thereof with respect to the housing are identical. There can be a completely symmetrical design of the poles. A capacitor from one pole to the housing can correspond to the difference in capacitance of both poles to the environment.

18 Claims, 3 Drawing Sheets

U.S. PATENT DOCUMENTS

| | | | |
|---|---|---|---|
| 4,503,351 A * | 3/1985 | Sonderegger et al. | 310/329 |
| 4,701,660 A | 10/1987 | Baumgartner et al. | |
| 5,297,430 A * | 3/1994 | Sonderegger et al. | 73/862.043 |
| 5,329,823 A * | 7/1994 | Sonderegger et al. | 73/862.642 |
| 5,402,684 A * | 4/1995 | Engeler et al. | 73/794 |
| 5,512,794 A * | 4/1996 | Kubler et al. | 310/329 |
| 6,777,856 B2 * | 8/2004 | Brechbuhl et al. | 310/328 |
| 7,548,012 B2 * | 6/2009 | Cavalloni et al. | 310/338 |
| 7,603,906 B2 * | 10/2009 | Kroger et al. | 73/714 |
| 2007/0199376 A1 * | 8/2007 | Cavalloni et al. | 73/167 |

FOREIGN PATENT DOCUMENTS

| | | |
|---|---|---|
| EP | 128552 A2 | 2/2003 |

\* cited by examiner

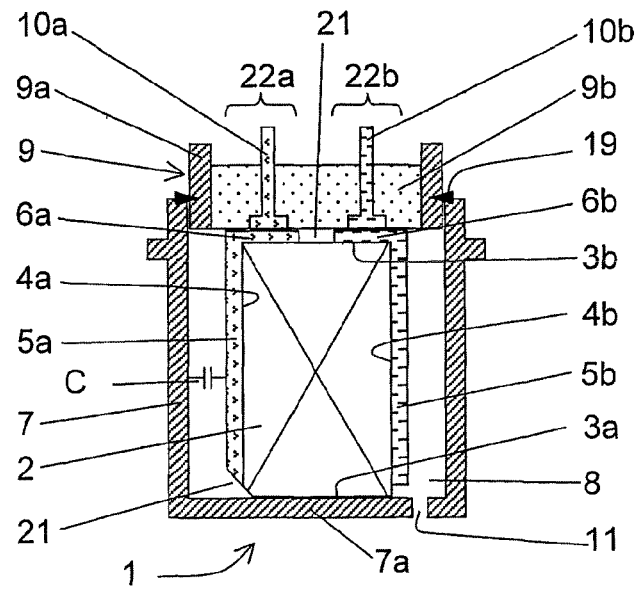
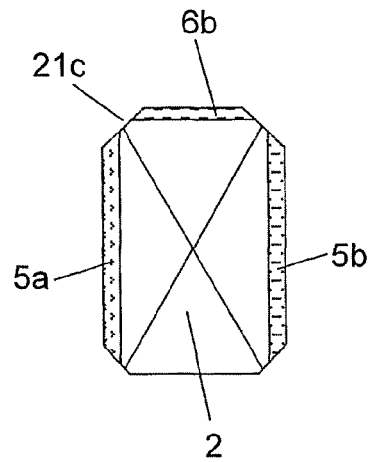
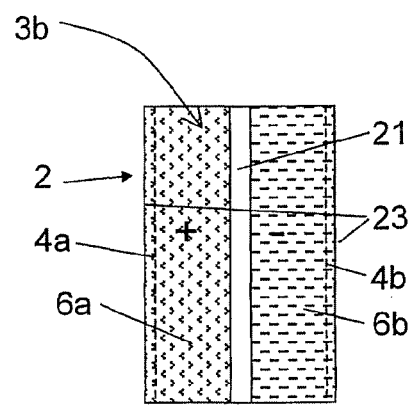
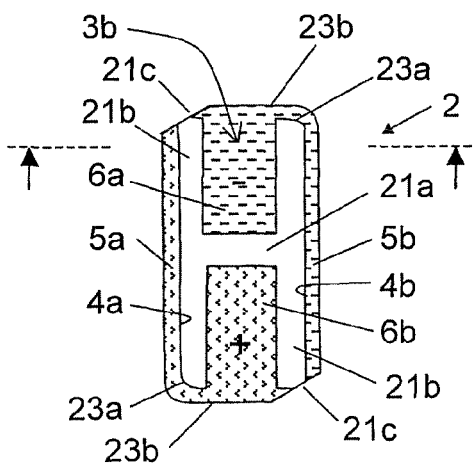
Fig. 2a
Fig. 2d
Fig. 2b
Fig. 2c

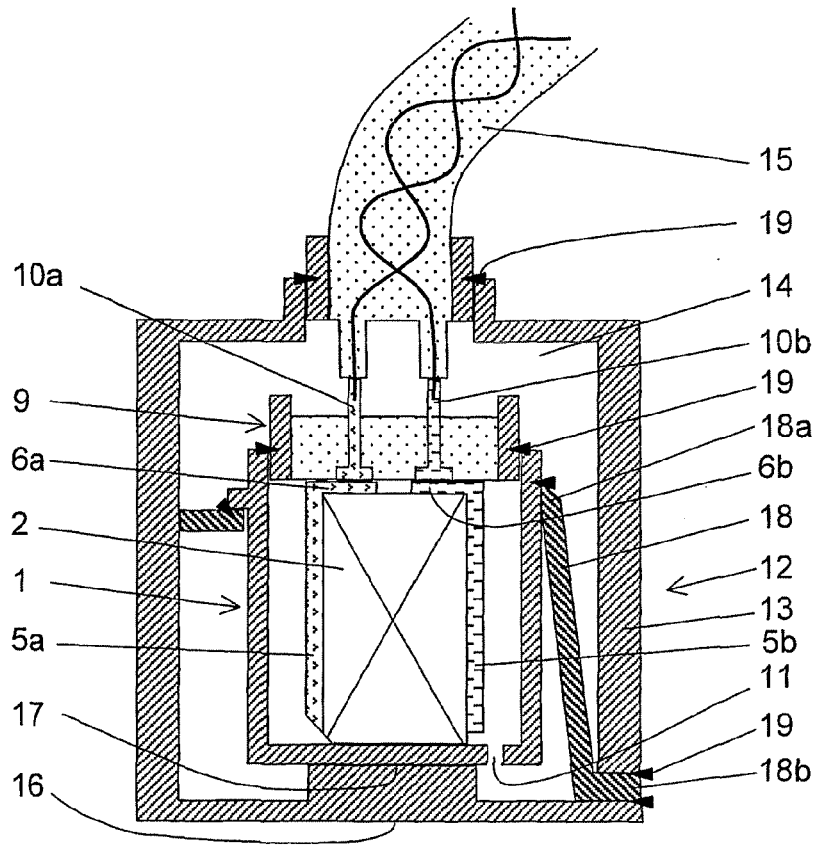
Fig. 3
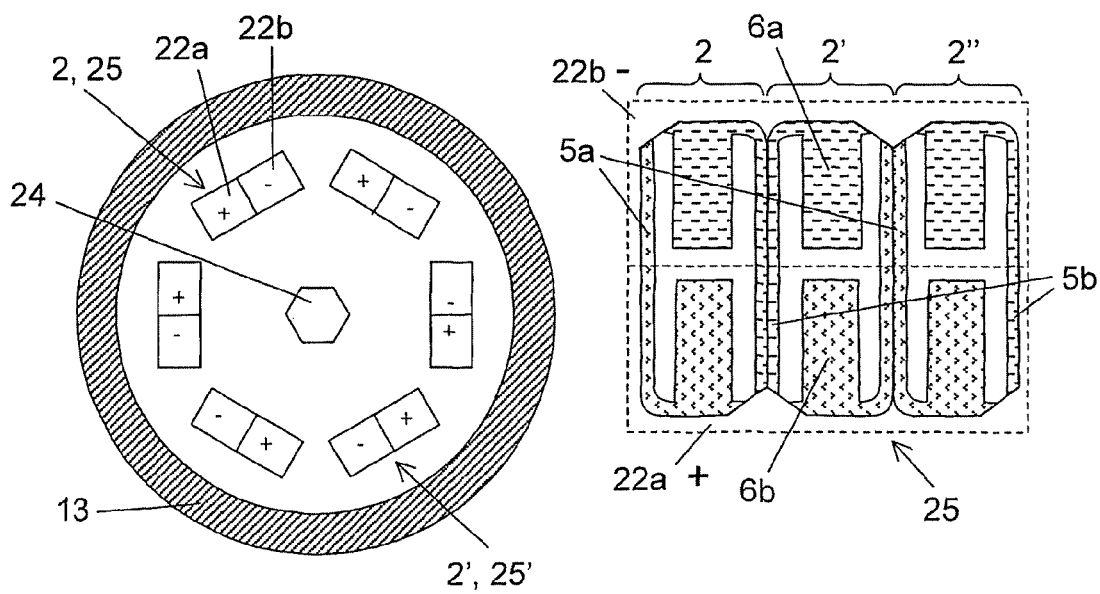
Fig. 4
Fig. 5

PIEZOELECTRIC MEASURING ELEMENT WITH TRANSVERSE EFFECT AND SENSOR COMPRISING SUCH A MEASURING ELEMENT

CROSS-REFERENCE TO RELATED APPLICATIONS

This application claims priority to Swiss Application No. 729/06 filed May 4, 2006, Swiss Application No. 924/06 filed Jun. 7, 2006, and International Application Serial No. PCT/CH2007/000212 filed May 2, 2007.

TECHNICAL FIELD

The invention relates to a piezoelectric measuring element as well as to a sensor comprising such a measuring element.

BACKGROUND

Piezoelectric measuring elements are used in a plurality of applications, for example in pressure, force, elongation or in acceleration sensors. During a measurement a body made of piezoelectric material is subjected to a mechanical strain whereby electrical charge is generated at particular surfaces of the body. This charge is collected and led to a cable connection by means of electrodes. Eventually, the cable transmits the charge to an amplifier which may also be a preamplifier.

Basically, there are two different possibilities for the transmission of the charge to the amplifier, namely using a coaxial cable or using a two conductor cable. If a coaxial cable is used the measurement data are transmitted from the first electrode to the inner conductor while the other electrode can lie on mass potential and can be connected to the shielding which protects the measurement line from external interfering fields. In addition, a second shielding can be provided by means of a triaxial cable. In contrast, if a two conductor cable is used the two electrodes are connected with two leads of a cable which itself can be shielded as a whole in a single or dual manner. At the amplifier, the charge difference between the two leads is evaluated. Since the leads are exposed to the same interfering fields no alteration in the charge difference results from an interfering field.

Applications using the two conductor technology are for example measuring elements having one or more piezoelectric plates with longitudinal effect. Longitudinal effect means that the charge is generated at those surfaces at which the force is introduced. These surfaces are most often metallised to collect the charge. Metallisations with the same polarization are each connected to one electrode and the electrode is provided with one of the two conductors. Since the metallised surfaces are under load a good contact of adjacent surfaces is always ensured.

Applications using the coaxial technology also comprise measuring elements having one or more piezoelectric plates with longitudinal effect the electrodes of which are connected to the inner conductor and the shielding, respectively. On the other hand, also the use of bars with transverse effect made of piezoelectric material with the coaxial technology is known. Transverse effect means that the surfaces at which charge is generated under load are positioned perpendicularly to the surfaces at which the load is introduced. EP 1 283 552 describes an application of this type comprising one, WO 2005/026678 an application comprising several bar crystals with transverse effect. In these cases, the electrodes which collect the charges are electrically connected to metallisations on the force-introducing surfaces ensuring a good contact for collecting the charge.

The advantage of piezoelectric bars with transverse effect over such plates with longitudinal effect lies in their sensitivity and in the cost-performance ratio. To obtain the same sensitivity which can be achieved with a thin bar with plates a plate stack of many plates must be used which is much more expensive than the bar and in addition also considerably high. To further increase the stability and the sensitivity of measuring elements containing bars also several or thinner bars can be used as mentioned in WO 2005/026678. In this application the electrodes are also electrically connected to metallisations on the two force-introducing surfaces of the piezoelectric bars whereby a good contact is obtained.

Another application using several bars is also known from FIG. 2 of EP 1 283 552. There, three bars are arranged in a triangle wherein in the interior of the triangle a spring receives the charge as the first electrode while the spring at the same time presses the external walls of the crystals to a metallic wall which is the second electrode.

The advantage of the two conductor technology compared to the coaxial technology is the ground insulation. Every measuring element with two conductor technology is inevitably ground insulated while a measuring element using coaxial technology often has an electrode on the mass potential. Only by an elaborate assembly using insulation rings and shields of the measuring element is a ground insulation obtained. This is for example requisite in the case of combustion engines due to the long signal leads to prevent interference by compensating voltages in ground connections, so called ground loops. It must be noted that the use of a sensor in a combustion engine requires a temperature stability of at least 300° C. This necessitates particular elements withstanding these temperatures.

It is not possible to use the known bars with transverse effect in two conductor technology since the individual electrodes due to the construction are subject to different interfering fields thus biasing the measurement signal.

BRIEF OBJECTS AND SUMMARY OF THE INVENTION

It is an object of the present invention to suggest a piezoelectric measuring element comprising at least one bar with transverse effect which can be used with two conductor technology.

This object has been achieved by the features of the independent claim.

The idea underlying the present invention is that the poles consisting of the metallisations, electrodes and lines in the measuring element are embodied with one or more piezoelectric bars with transverse effect such that the electric capacitances thereof with respect to the housing are identical. This is for example achieved by means of a completely symmetrical design of the poles or by providing a capacitor from one pole to the housing corresponding to the differences in capacitance of both poles to the environment.

SHORT DESCRIPTION OF THE DRAWINGS

In the following, the invention will be explained in more detail with respect to the drawings in which FIG. 1 shows a schematic representation in cross section of a sensor according to the prior art;

FIG. 2a shows a cross section of a schematic representation of a measuring element according to the invention;

FIG. 2b shows a top view of a piezoelectric bar with metallisations as in FIG. 2a;

FIG. 2c shows a top view of a piezoelectric bar of FIG. 2a but with different metallisations;

FIG. 2d shows a cross section of a piezoelectric bar with metallisations as in FIG. 2c;

FIG. 3 shows a cross section of a schematic representation of a sensor according to the invention;

FIG. 4 shows a symmetric arrangement of several bars within a sensor;

FIG. 5 shows a top view of a measuring element comprising several bars lying on top of each other in opposite arrangement.

DETAILED DESCRIPTION OF EXEMPLARY EMBODIMENTS

Figure 1:
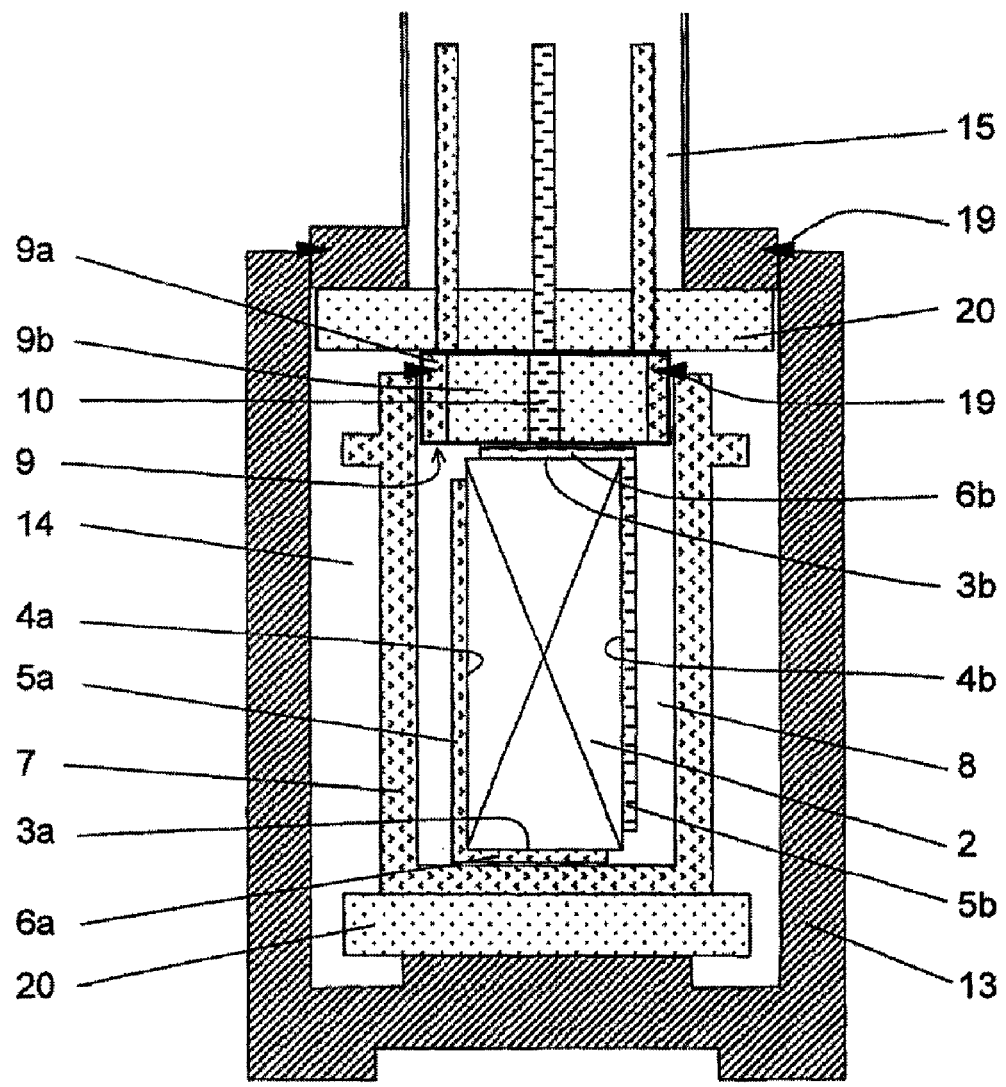

FIG. 1 shows a ground insulated measuring element for combustion engines according to the prior art in cross section. It comprises a bar 2 made of piezoelectric material with transverse effect. The bar 2 comprises two opposing front surfaces 3a, 3b which are the surfaces of introduction of a force to be measured, and opposing surfaces 4a, 4b provided with metallisations 5a, 5b for collecting surface charges. Each of the metallisations 5a, 5b extends to an electrode 6a, 6b on one of the front surfaces 3a, 3b. The bar 2 is located in the interior space of a housing 7 which can also be a tension sleeve for pre-tensioning the bar 2. A cover 9 seals the housing 7 containing the bar 2. The bar 2 can have any suitable area, in particular a rectangular, ellipsoid, concave, or convex area or combinations thereof.

The sensitivity of cube-shaped bars with transverse effect is proportional to the ratio of the length of the bar which is defined by the distance between the load-receiving surfaces 3a, 3b, and its thickness which is defined by the distance between the charge-collecting surfaces 4a, 4b. Thus, the sensitivity increases proportionally the thinner the plates become. To increase the stability of the measuring element and to further increase the sensitivity several plates may be used. To achieve the same value using disc-shaped plates it would be necessary to use very many discs, which would be very expensive. Furthermore, the length of the measuring element would be considerably high thus representing a further disadvantage.

In this arrangement, the housing 7 lies on the potential of the first electrode 6a since this electrode makes direct contact to the housing 7 with one contact surface. The cover 9 comprises a metallic outer ring 9a which due to direct contact to the housing 7 also lies on the potential of said electrode 6a. In the middle, the cover comprises a contact site 10 insulated from the outer ring 9a and being in electric contact to the second electrode 6b. This contact is also obtained by a shared contact surface between the electrode 6b and the contact site 10 of the cover 9. To prevent a short circuit the cover must be equipped with an insulation 9b between the outer ring 9a an the central contact site 10. The outer ring 9a is welded to the housing 7 under pre-tension at a welding site 19.

If the measuring element is now to be built into the interior space 14 of a sensor housing 13 the sensor housing must be insulated because the tension sleeve is on the same potential with the first electrode 6a. Therefore, insulation rings 20 are arranged on both sides of the measuring element to the sensor housing 13. A coaxial cable 15 extends through one of the insulation rings 20 to the cover 9 where it makes electric contacts to the two electrodes 6a, 6b. For a measuring element built in this manner, the line 15 to a preamplifier or an amplifier must consist of a coaxial cable, preferably with an additional shield (not shown), in order to insulate from interference on the measurement signal.

FIG. 2a is a representation of a ground insulated measuring element 1 according to the invention in cross section. Analogously to FIG. 1 with the same reference numerals is represented a bar 2 made of piezoelectric material with transverse effect having two opposing front surfaces 3a, 3b serving as the surfaces at which the force to be measured is introduced. This bar 2 further comprises two other opposing surfaces 4a, 4b provided with metallisations 5a, 5b for the collection of surface charges. Also in this embodiment both metallisations 5a, 5b extend each to one electrode 6a, 6b situated on a front surface. According to the invention in this embodiment, however, both electrodes 6a, 6b are positioned on the same front surface 3b. The other front surface 3a is electrically insulated from both electrodes 6a, 6b. This is for example achieved by extending the metallisations 5a, 5b not completely up to the front surface 3a as represented on the right side of FIG. 2a. Alternatively, this may also be achieved by a phase 21 at the edge of the front surface 3a which is disposed after the metallisation as shown on the left side of FIG. 2a. The front surface 3b now supports the two electrodes 6a and 6b. In order to electrically insulate the two from each other, the metallisation on this front surface 3b is disrupted by a separation face 21.

Alternatively, the electrodes 6a, 6b can also collect the charge directly at the surfaces 4a, 4b for the collection of surface charges in which case none of the front surfaces need to be provided with a metallisation. This can for example be obtained by a spring as has been described in the prior art.

A housing 7 having an interior space 8 surrounds the bar 2 in this embodiment. A cover 9 seals the housing 7. The bar 2 is positioned under pre-tension between the housing 7 and the cover 9. This is preferably achieved by a welding site 19 between the housing 7 and the cover 9.

The cover 9 has two identical fed-through, pin-shaped contact sites 10a, 10b insulated from each other and electrically contacting the two electrodes 6a, 6b.

To achieve the ground insulation the housing 7 must be electrically insulated from both electrodes 6a, 6b. This is for example obtained by the fact that the cover 9 has an outer metallic ring 9a with an inner insulation 9b, for example made of ceramics, provided with a two conductor feedthrough for the contact sites 10a and 10b. Instead of ceramics there may also be chosen glass or any other suitable material for the insulator.

The bar 2 is to be centered in the housing 7. This can be achieved by providing the housing 7 with a floor plate 7a having guide grooves (not shown) into which the bar 2 is inserted. On the other hand, the housing 7 may also have one or more openings 11 towards the interior space 8 to provide access to the bar 2 for centering which must be carried out prior to the application of the pre-tension. These openings 11 can be provided at the floor plate 7a of the housing 7 and/or extend over one or more areas of one or more lateral surfaces. After completion of the centering, these openings can also be resealed in a gas-tight manner.

To simplify the centering there can be used as the bar 2 also a crystal element with socket-shaped base as described in EP 1 283 552 A2. The phases for the separation of the electrodes must be arranged accordingly.

The sealing of the housing 7 is gas-tight. Thus, if the tension sleeve has no openings the measuring element 1 described herein is already a completed sensor the membrane of which is embodied by the floor plate 7a of the housing 7.

The two contact sites 10a and 10b on the cover 9 are now to be led by means of a two conductor cable to an amplifier or a preamplifier.

This arrangement is inventive due to its completely symmetrical arrangement regarding two poles 22a, b which comprise the metallisations 5a, b, the guide for the two electrodes 6a, b as well as the contact sites 10a, b for the lines. In contrast to the arrangement according to the prior art described above the difference in the potentials of the two lines is evaluated in this arrangement. Therefore, an electrical interference from the environment must always have an identical impact on both poles of the measurement line to have no influence on the difference. Also, for this reason no coaxial cable can be used for the transmission of the measurement signal to the pre-amplifier or the amplifier since an external interfering signal does not have the same influence on both lines. Therefore, also the contact sites 10a and 10b must be the same. They are embodied as identical pins and not as a pin and a ring as in the prior art.

To compensate for a possible asymmetry of the capacities an additional capacitor C may be disposed between one of the poles and the environment, for example of the housing 7, wherein the capacitor C has an appropriate value to provide the required symmetry.

A measuring element according to FIG. 2a can already be used as a simple form of a sensor, for example also as a construction kit.

Several possibilities exist for guiding the electrodes. FIGS. 2b and 2c show top views of two different embodiments. The embodiment in FIG. 2b corresponds to the representation of FIG. 2a in which the lateral metallisations 5a, b extend to the front surface 3b where a phase 21 or any other disruption on the front surface 3b separates the electrodes 6a, b. To ensure a good contact of the metallisations on the edges between the surface 3b to the adjacent surfaces 4a, b these edges may preferably be provided with roundings 23. This is not shown in FIG. 2a. In FIG. 2b, the top view of the bar 2, the positions of these roundings 23 are represented. This type of metallisation is mainly suitable for thicker bars 2.

For thinner bars 2 the electrodes become very small laterally. In this case, the alternative embodiment shown in FIGS. 2c and 2d is preferred. The bar 2 is provided with roundings 23a each at one longitudinal edge of the surfaces 4a, b for collecting the charges and with roundings 23b at two edges of the front surface 3b not adjoining the surfaces 4 for the collection of charges. Afterwards, all surfaces except the front surface 3a are provided with metallisations. Eventually, phases 21a, b, and c are applied to separate the metallisation into two electrically distinct electrodes 6a, b, namely a phase 21a on the front surface 3b in the center between the roundings 23b, phases 21b laterally on the front surface 3b so that an H form of all phases present is obtained, and phases 21c each on that longitudinal edge of the surfaces 4a, b for collecting the charges which is not provided with a rounding. The metallisations described in FIGS. 2b and 2c each result in two electrically distinct electrodes both of which can be removed on the same front side 3b. Furthermore, the metallisations and thus the poles 22 are symmetrical. This novel feature of a piezoelectric bar with transverse effect enables the use in an application for two conductor technology.

FIG. 3 describes a sensor 12 comprising a sensor housing 13 with an interior space 14, a measuring element 1 attached in the interior space 14 in the area of a cover 9, a two conductor cable 15 with electrical connections to two contact sites 10a, 10b of the measuring element 1 as well as a membrane 16 with a force transmission surface 17 adjacent to the measuring element 1. Several welding sites 19 hold the sensor 12 together. According to the invention, the measuring element 1 corresponds to a measuring element as described in FIG. 2.

Since the measuring element 1 in contrast to a measuring element according to FIG. 1 is already ground insulated it can be directly attached to the sensor housing 13 and the membrane 16 without insulations. To avoid transmissions of strains at the sensor housing 13 onto the measuring element 1 as they are for example caused by screwing into a component a so called anti-strain sleeve 18 can be used. Instead of attaching the measuring element 1 in the area of the cover 9 by means of a direct connection to the sensor housing 13 as demonstrated as one embodiment on the left side of FIG. 3 this anti-strain sleeve 18 connects the measuring element 1 in the area of the cover 9 with the sensor housing 13 in the area of the membrane 16 as shown in the right half of FIG. 3. In this way, deformations of the sensor housing 13 do not exert any forces on the measuring element 1 and the bar 2.

Because the cover 9 is attached to the housing 7 in a gas-tight manner the space around the bar 2 can be put under vacuum before it is welded. This space can comprise only the interior space 8 of the housing 7 or, if openings 11 are provided on the housing 7, also the part of the interior space 14 of the sensor housing 13 up to the anti-strain sleeve 18 or an equivalent connection between sensor housing 13 and measuring element 1.

To increase the stability of the measuring element and at the same time increase the sensitivity there can also be positioned several bars 2 in one housing 7 as depicted in FIG. 4. For this purpose, it has to be ensured that the arrangement is completely symmetrical with respect to the two poles 22. That means that the same number of positive and negative polarisation faces of the bars 2 must be facing the exterior. Generally speaking, the sum of the capacitances of the positive polarisations must be identical to the sum of the capacitances of the negative polarisations of the bars 2 to the environment, in this case to the housing 7. Therefore, an even number of bars 2 must be provided. The electrodes of identical polarity are then brought together and connected to a contact site 10 of the two connector cable.

A different type of centering and pre-tension can be achieved if an arrangement as depicted in FIG. 4 is provided with a centrally arranged device 24 which enables pre-tensioning. In this case the pre-tension sleeve 7 is omitted in favor of a central bolt 24. Also in this case an anti-strain sleeve 18 can be employed accordingly.

Preferably, the bars 2 comprise metallisations with electrically distinct electrodes having capacitive symmetries and comprise both electrodes on the same front surface. Instead of simple bars 2 also blocks 25 of bars can be used.

The following describes an option wherein several bars 2 are joined to form a block 25. For this purpose there is used preferably—but not necessarily—an odd number of bars 2. As shown in FIG. 5, these bars 2 are each arranged in opposite polarisation and joined to each other by their metallisations 5a, b each having the same polarisation. Metallisations 5a, b which collect the charges are not only attached to the contacting surfaces but also to the corresponding external surfaces. To deliver the charge to the front surfaces 3b also those surfaces may be metallised which are adjacent to the front surfaces 3b and the charge-collecting surfaces 4a, b. Roundings 23 of the edges corresponding to those described in FIG. 2c are advantageous. The phases 21 which are to be provided in order to separate the metallisations into two electrically distinct electrodes correspond to those in FIG. 2c. In this way two poles 22a, b can be created each of which extends over one half of a block 25, as depicted in FIG. 5.

Such a block 25 can be more easily centered than a single bar 2 since the bars 2 joined at the metallisations are combined to a large block. Furthermore, also the manufacture of such a block is cost-effective since it can be fabricated in a wafer.

Blocks 25 made of odd numbers of bars 2 can be used individually or in groups. Blocks of an even number of bars 2 can also be used by arranging several of such blocks so that they as a whole become symmetrical again with respect to their poles. An example of an arrangement is given in FIG. 4. Each of these blocks then comprises two positive or two negative external surfaces. Arranged in an alternating sequence the required symmetry is then obtained again.

The advantage of such a measuring element according to the invention or sensor, respectively, is the simple and therefore cost-effective assembly to obtain the ground insulation. Furthermore, no temperature restriction due to a use of heat sensitive components is required.

LIST OF REFERENCE NUMERALS 1 measuring element
2 2' bar
3 3a, 3b front surfaces, force-introducing surfaces
4 4a, 4b surfaces for collecting the surface charges
5 5a, 5b metallisations
6 6a, 6b electrodes
7 tension sleeve, housing of the measuring element
7a floor plate of tension sleeve/housing
8 interior space of tension sleeve/housing
9 cover with
9a outer ring
9b insulation
10 10a, 10b contact sites of the cover
11 opening in the tension sleeve
12 sensor
13 sensor housing
14 interior space of housing
15 cable, line, two conductor or coaxial
16 membrane
17 force transmission surface
18 18a, 18b anti-strain sleeve with two ends
19 welding site, welding
20 20a, 20b insulation rings
21 phase, separation face
22 22a, 22b pole
23 rounding
24 pre-tensioning device, central bolt
25 block
C capacitor

The invention claimed is:

1. A measuring element comprising one or more piezoelectric bars with transverse effect, each bar having two force-introducing surfaces and two charge-collecting surfaces, each bar being disposed in a housing comprising two poles insulated from each other wherein each pole comprises a contact site for the connection to a two conductor measurement signal line as well as an electrode electrically connected thereto and one or more metallisations electrically connected thereto on the charge-collecting surfaces of the bars wherein the electric capacitances as defined between each pole and the housing, which is electrically insulated therefrom by material properties and geometric conditions, are identical.

2. A measuring element according to claim 1 wherein the poles have a completely symmetrical design with respect to materials and geometry.

3. A measuring element according to claim 1 wherein between one of the poles and the housing is provided an additional capacitor which compensates an existing difference in the capacitances determined by materials or geometry.

4. A measuring element according to claim 1, wherein at least one of the bars has a front surface with both electrodes disposed on the same front surface and the electrodes are electrically separated from each other.

5. A measuring element according to claim 1, wherein of one or more bars one front surface each is electrically insulated from both electrodes.

6. A measuring element according to claim 1, wherein the housing comprises a cover with a two conductor feedthrough.

7. A measuring element according to claim 1, wherein the housing is sealed in a gas-tight manner.

8. A measuring element according to claim 1, wherein at least one of the bars is pre-tensioned within the housing.

9. A measuring element according to claim 8, wherein the pre-tensioning is obtained by one of the group consisting of: a pre-tension sleeve, a membrane, and a central pre-tensioning device.

10. A measuring element according to claim 1, wherein at least one group of several bars has the bars arranged symmetrically in the measuring element.

11. A measuring element according to claim 10, wherein a group of bars or a group of blocks is arranged in one or more rows.

12. A measuring element according to claim 10, wherein a group of bars or a group of blocks is arranged on a circle.

13. A measuring element according to claim 1, wherein at least two bars are arranged adjacent to each other in an opposite orientation with respect to their polarisations in a block and comprise metallisations on their contact surfaces.

14. A measuring element according to claim 13 wherein at least one group of several blocks is arranged symmetrically in the measuring element.

15. A measuring element according to claim 14, wherein a group of bars or a group of blocks is arranged in one or more rows.

16. A measuring element according to claim 14, wherein a group of bars or a group of blocks is arranged on a circle.

17. A sensor comprising a sensor housing with an interior space, a measuring element according to claim 1, wherein said measuring element is attached in the interior space together with a membrane having a force transmission surface adjacent to the measuring element.

18. A sensor according to claim 17 wherein the measuring element is attached in the area of the cover to one end of an anti-strain sleeve wherein the other end of the anti-strain sleeve is affixed to the sensor housing in the area of the membrane.

* * * * *